(12) United States Patent
Burgbacher et al.

(10) Patent No.: US 6,928,896 B2
(45) Date of Patent: Aug. 16, 2005

(54) ACTUATING DEVICE FOR AN AUTOMATIC TRANSMISSION OF A MOTOR VEHICLE

(75) Inventors: Martin Burgbacher, Esslingen (DE);
Jens Dorfschmid, Notzingen (DE);
Hans-Peter Fiederlein, Altbach (DE);
Harald Nauerz, Karlsruhe (DE);
Joern-Marten Ohle, Leonberg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/303,056

(22) Filed: Nov. 25, 2002

(65) Prior Publication Data

US 2003/0144112 A1 Jul. 31, 2003

(30) Foreign Application Priority Data

Nov. 23, 2001 (DE) .......................... 101 57 459

(51) Int. Cl.⁷ .......................... F16H 59/00; B60R 25/06
(52) U.S. Cl. .......................... 74/335; 477/907; 70/247
(58) Field of Search .......................... 74/336 R, 335; 477/122–125, 96, 99; 70/245, 247

(56) References Cited

U.S. PATENT DOCUMENTS

| 3,675,034 A | * | 7/1972 | Abplanalp et al. ........... 307/9.1 |
|---|---|---|---|
| 3,718,202 A | * | 2/1973 | Brock ........................ 180/287 |
| 4,843,901 A | | 7/1989 | Peterson et al. |
| 5,009,295 A | * | 4/1991 | Kinkade et al. ......... 192/220.2 |
| RE34,064 E | * | 9/1992 | Tury et al. .................... 74/335 |
| 5,919,112 A | | 7/1999 | Michael et al. |
| 6,059,687 A | * | 5/2000 | Durieux et al. ............... 477/94 |
| 6,230,576 B1 | * | 5/2001 | Yamada et al. ............... 74/335 |
| 6,378,393 B1 | * | 4/2002 | Bates ...................... 74/473.18 |
| 6,439,014 B1 | * | 8/2002 | Syamoto ...................... 70/247 |

FOREIGN PATENT DOCUMENTS

| DE | 43 04 250 C1 | 6/1994 |
|---|---|---|
| DE | 44 47 512 A1 | 3/1996 |
| DE | 196 25 019 A1 | 1/1998 |
| DE | 196 43 303 A1 | 4/1998 |
| DE | 199 29 360 A1 | 12/2000 |

* cited by examiner

*Primary Examiner*—Roger Pang
(74) *Attorney, Agent, or Firm*—Crowell & Moring LLP (57) ABSTRACT

The invention relates to an actuating device for an automatic transmission of a motor vehicle. To allow the motor vehicle to be operated safely and managed conveniently, the invention makes provision for the actuating device to have not only a first device, by which a parking interlock can be engaged and released in normal operation of the actuating device, but also a second device, by which the parking interlock can be engaged in the event of a malfunction.

32 Claims, 3 Drawing Sheets

ACTUATING DEVICE FOR AN AUTOMATIC TRANSMISSION OF A MOTOR VEHICLE

This application claims the priority of German Patent Document No. 101 57 459.2-14, filed Nov. 23, 2001, the disclosure of which is expressly incorporated by reference herein.

BACKGROUND AND SUMMARY OF THE INVENTION

The invention relates to an actuating device for an automatic transmission of a motor vehicle.

DE 43 04 250 C1 discloses an actuating device for an automatic transmission. The actuating device has a selector shaft, which can be moved into a position corresponding to the "N" drive setting, irrespective of the position of an electric motor. This makes it possible to tow the vehicle away, even when a transmission control system has failed. Positioning is carried out by an unlocking lever that can be unlocked manually. The unlocking lever is actuated within the interior of the vehicle by an actuating device, which is connected to the unlocking lever by a Bowden line. At the same time, an ignition lock is released by way of a second Bowden line, allowing an ignition key to be withdrawn.

DE 196 43 303 A1 describes a safety device that has an electric parking interlock, which can be unlocked by a spring accumulator in the event of emergency unlocking. The spring accumulator is activated by turning an ignition key in an ignition lock.

U.S. Pat. No. 4,843,901 describes a drive-setting selector device of an automatic transmission of a motor vehicle, in which drive settings can be selected by electric pressure switches. A selector shaft of the automatic transmission is turned to the selected position by an electric motor mounted on the automatic transmission.

If the electric drive-setting selector device fails, a drive shaft of the electric motor can be moved into a desired position by hand with the aid of a tool. For correct positioning, marks indicating the various drive settings are provided close to the selector shaft. In the event of a malfunction, a driver of the vehicle has to leave the interior of a vehicle and turn the selector shaft to the desired position with the tool in an engine compartment. If the motor vehicle is not secured against rolling away by a parking brake or a parking interlock, the driver of the vehicle is at risk of being run over on a slope.

Faced with this situation, it is the object of the invention to propose an actuating device by which the motor vehicle can be operated safely and dealt with conveniently.

According to one aspect of the invention, an actuating device has a drive-setting selector device, which has at least one park position (P) and further positions (R, N, D). The drive-setting selector device can be operated by a driver of the vehicle and, in particular, can be arranged in the vicinity of a steering wheel or in the region of a center console. Selection of the various positions can be effected by displacing or turning an operating lever or by actuating buttons or switches representing the various positions, for example.

The drive-setting selector device communicates via signals with at least one control device, which detects the selected position of the drive-setting selector device. The control device can be identical with a control device that controls functions of the automatic transmission or can be embodied separately.

The control device controls at least one actuator. The actuator can preferably be electric, such as an electric motor, or can be hydraulic or pneumatic. The actuator can be arranged inside a housing of the automatic transmission or outside the housing.

Various drive ranges of the automatic transmission can be selected by the actuator. In particular, the drive ranges correspond to the positions which can be assumed by the drive-setting selector device. In particular, the drive ranges can be selected by turning or axially displacing a selector shaft and/or through the activation of various gear-change elements of the automatic transmission.

The parking interlock advantageously has a parking-interlock wheel, which is connected in a rotationally fixed manner to an output shaft of the automatic transmission. The parking-interlock wheel can be secured in a rotationally fixed manner relative to the housing of the automatic transmission by a pawl. When the parking interlock is engaged, the motor vehicle is thus secured against rolling away.

The parking interlock can be engaged and released by a first device. In particular, the device is actuated by an actuator, which may be identical to or separate from the actuator by which the drive ranges can be selected.

In addition, the actuating device has a second device, by which the parking interlock can be engaged. Engagement of the parking interlock by the second device is performed, in particular, in the event of a malfunction. In the event of a malfunction, the parking interlock can no longer be engaged by the first device. This can be caused by failure of the control device or the actuator, for example.

The actuating device according to the invention allows the motor vehicle to be operated in a particularly safe manner. With the second device, the motor vehicle can be secured against rolling away in any state. In addition, protection against theft is ensured since release of the parking interlock can only be performed by an actuator, for the activation of which a control device is required. The control device operates only when it is activated by an authorized driver of the vehicle.

The automatic transmission can, in particular, be embodied as a planetary automatic transmission, as a continuously variable transmission or as a step-change transmission with an automated clutch and automated gear changes.

As a refinement of the invention, the actuating device has an ignition switch, which has at least two positions ("inactive", "active"). The ignition switch can be embodied as a rotary switch, a sliding switch or a pressure switch, for example. The ignition switch can be used to activate control devices of the motor vehicle. In addition, the ignition switch can trigger starting of an engine, for which purpose it can have a further position ("Start"). In particular, the ignition switch can be embodied as an ignition lock.

Between the ignition switch and the second device, by which the parking interlock can be engaged, there is an effective connection, which can be mechanical and/or hydraulic and/or pneumatic, for example. The parking interlock can be engaged by the effective connection and the second device.

This refinement is particularly economical and space-saving since motor vehicles generally have ignition switches, that is to say there is no need for an additional component for reliable engagement of the parking interlock.

As a refinement of the invention, the ignition switch has a further position ("emergency actuation"), by setting which the parking interlock can be engaged. This refinement is particularly convenient since the driver of the vehicle can use the ignition switch, which is familiar to him, to engage the parking interlock, particularly in the event of a malfunction, and does not require an additional operating device, the location of which he first of all has to look for.

As a refinement of the invention, the "emergency actuation" position is arranged on the ignition switch in the opposite direction from the "active" position in relation to the "inactive" position. In the case of a malfunction, in particular, the ignition switch must be moved counter to the otherwise customary direction when engaging the parking interlock. This constitutes a particularly reliable refinement since incorrect operation by the driver of the vehicle is made more difficult.

As a refinement of the invention, the ignition switch has a locking device, which allows the ignition switch to be moved only into a position different from the "emergency actuation" position in normal operation of the actuating device. The locking device can be electromagnetic and/or mechanical, for example. When the locking device is deactivated, the ignition switch can be moved to the "emergency actuation" position. The locking device can, in particular, be deactivatable by the driver of the vehicle, deactivatable by a control device or be configured in such a way that it is self-deactivating in the event of a malfunction. The locking device can be embodied in such a way that the ignition switch can be moved only into the "emergency actuation" position in the deactivated state of the ignition switch.

This refinement is particularly reliable since it makes incorrect operation by the driver of the vehicle particularly difficult.

As a refinement of the invention, the ignition switch is embodied as an ignition lock, which can be operated by an ignition key. The ignition lock has a withdrawal prevention device, which allows the ignition key to be withdrawn only when the parking interlock is engaged. The withdrawal prevention device can be electromagnetic and/or mechanical, for example. In the case of an electromagnetic embodiment, the withdrawal prevention device is controlled by a control device. The control device can be the control device that controls the actuator for selecting the various drive ranges; the control device that controls the functions of the automatic transmission; or a separate control device.

This refinement is particularly advantageous since it enables different national legal regulations on the operation of motor vehicles with an automatic transmission to be complied with. It is thus possible to buy just one version of the actuating device in different countries. This is economical since there is no need to develop, manufacture and sell any further versions.

As a refinement of the invention, the ignition switch is embodied as an ignition lock, which can be operated by an ignition key. The ignition lock has a device which allows the ignition lock to be moved only into a position different from the "emergency actuation" position in normal operation of the actuating device. The same device ensures that the ignition key can be withdrawn only when the parking interlock is engaged.

This refinement is particularly economical since just one device can perform two functions.

As a refinement of the invention, actuation of the ignition switch into the "emergency actuation" position is prevented by the effective connection between the ignition switch and the second device for engaging the parking interlock. This refinement is particularly economical since the existing effective connection can perform a further task in addition to engaging the parking interlock in the event of a malfunction.

As a refinement of the invention, the ignition switch has an emergency unlocking device, by which the ignition switch can be moved into the "emergency actuation" position in the event of a malfunction. The emergency unlocking device can be operated by the driver of the vehicle. This refinement is particularly reliable since it makes incorrect operation by the driver of the vehicle particularly difficult.

As a refinement of the invention, the control device communicates via signals with a first sensor, which detects whether there is an ignition key in an ignition lock, and/or with a second sensor, which detects whether a door of the motor vehicle is open or closed. In the event of a malfunction, the parking interlock can be engaged when the ignition key is removed from the ignition lock and/or when a door of the motor vehicle is opened on the basis of a signal from the control device. The signals from the sensors can be evaluated individually or in combination. This refinement can be used especially in vehicles that do not have an ignition key and an ignition lock and in which the engine can be started by a starter button, for example.

This refinement is particularly reliable and convenient since the parking interlock can be engaged in the event of a malfunction without special action by the driver of the vehicle.

As a refinement of the invention, the actuating device has an energy storage device, e.g. a battery. This means that the control device and an actuator, by which engagement of the parking interlock can be triggered, are operational even if the vehicle electrical system fails, for example. This ensures particularly safe operation of the motor vehicle.

As a refinement of the invention, the second device for engaging the parking interlock has a parking-interlock accumulator, by which the parking interlock can be engaged in the event of a malfunction. The parking-interlock accumulator can be embodied as a spring accumulator, hydraulic accumulator or compressed-air accumulator, for example. The parking-interlock accumulator can be embodied in such a way that engagement of the parking interlock can be performed just once; after this engagement, the accumulator must be reset.

This refinement is particularly convenient since the driver of the vehicle does not have to apply a force for engagement of the parking interlock himself but has only to release the parking-interlock accumulator.

As a refinement of the invention, the parking interlock can be engaged independently of the actuator by which the first device is actuated. For this purpose, the parking interlock can be decoupled from the first device. This refinement allows reliable operation of the parking interlock since it can be engaged even in the case where the first device is locked, due to a mechanical defect for example.

As a refinement of the invention, the second device for engaging the parking interlock is in effective connection with a third device, by which an engine bonnet of the motor vehicle can be unlocked. The effective connection can be mechanical, being embodied, in particular, as a Bowden line, and/or hydraulic and/or pneumatic.

This refinement is particularly economical and space-saving since there are generally devices for unlocking the engine bonnet in motor vehicles, and there is therefore no need for an additional device.

All the control devices mentioned can be arranged inside or outside the housing of the automatic transmission.

Other objects, advantages and novel features of the present invention will become apparent from the following

DETAILED DESCRIPTION OF THE DRAWINGS

Figures 1, 2:
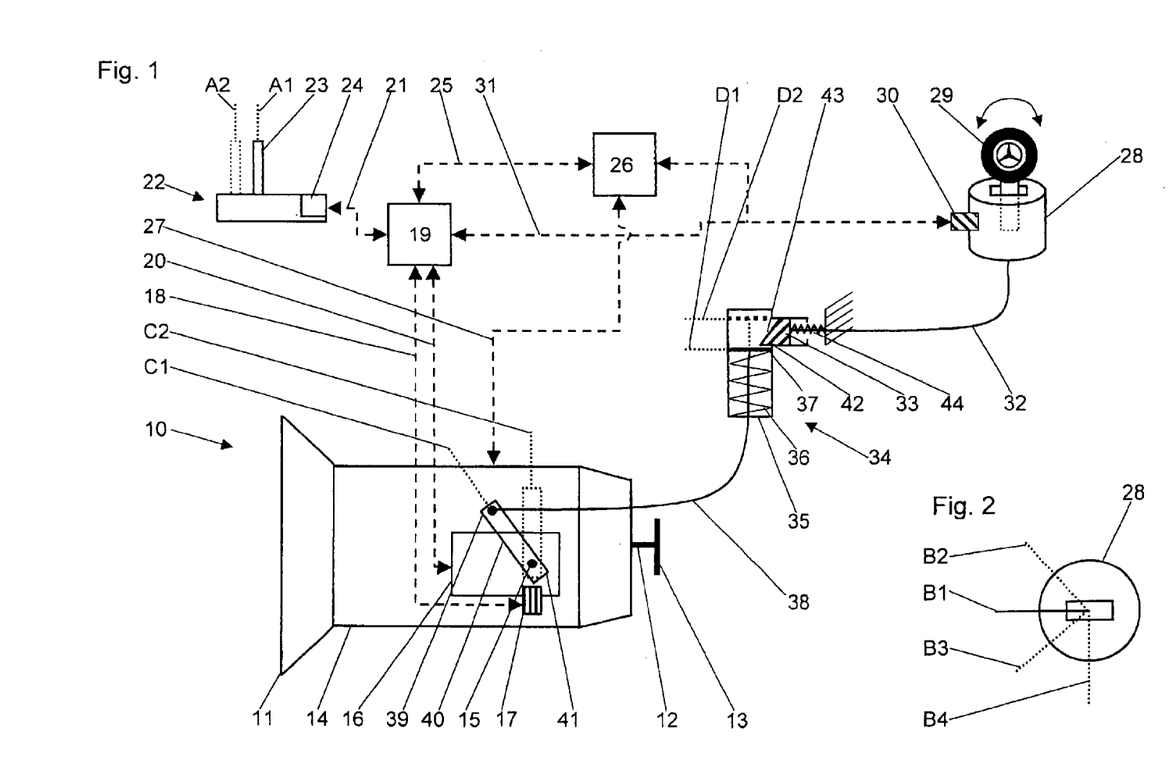
FIG. 1 shows an actuating device with an ignition lock in a first exemplary embodiment
FIG. 2 shows the ignition lock from the first exemplary embodiment illustrated differently

An automatic transmission 10 of a motor vehicle (not shown), which is embodied as a planetary automatic transmission, is actuated by the actuating device illustrated in FIG. 1. At its front end 11, the automatic transmission 10 is connected to an engine (not shown). The automatic transmission has a power-output shaft 12, which is connected to a power-input shaft (not shown) by a power-output flange 13. A rotational speed, output by the engine, and a torque can be converted by the automatic transmission 10 and fed to driven wheels (not shown) by the power-output shaft 12, the power-output flange 13 and the power-input shaft.

The automatic transmission 10 has a parking interlock (not shown). When the parking interlock is engaged, the power-output shaft 12 is connected in a rotationally fixed manner to a housing 14 of the automatic transmission 10. The motor vehicle is thus secured against rolling away.

Various drive ranges are selected in the automatic transmission 10 by turning a selector shaft 15. The automatic transmission 10 has the following drive ranges: park, reverse, neutral and forward drive. Selecting the park drive range interrupts the connection between the engine and the driven wheels, and the motor vehicle is secured against rolling away by the parking interlock. To move the motor vehicle backwards, the reverse drive range must be selected; to move the motor vehicle forwards, the forward-drive drive range must be selected. In the neutral drive range, the connection is likewise interrupted but the parking interlock is not engaged and the motor vehicle can be pushed or towed away.

The selector shaft 15 is turned by an actuator 16, which is mounted on the outside of the housing 14 of the automatic transmission 10. The actuator 16 has an electric motor (not shown), which is coupled to the selector shaft 15 by appropriate mechanical components. Mounted on the actuator 16 is a sensor 17, which detects the set position of the selector shaft 15 and transmits it to a control device 19 by a signal line 18.

The control device 19 generates control signals for the actuator 16, which are transmitted to the actuator 16 by a signal line 20. On the basis of the control signals, the actuator 16 turns the selector shaft 15 to the desired position. The actuator 16 feeds back its current position to the control device 19 by the signal line 20. The control device 19 is connected to a control device 24 of a drive-setting selector device 22 by a signal line 21.

The drive-setting selector device 22 has an operating lever 23, which can be moved into various positions in the longitudinal direction of the drive-setting selector device 22 by displacement. The drive-setting selector device 22 has a park position P and the positions R for reverse, N for neutral and D for forward drive. These positions of the drive-setting selector device 22 correspond to the positions of the selector shaft 15. Starting from the D position, the drive-setting selector device 22 additionally has two unstable positions (plus, minus), which are arranged perpendicularly to the direction in which the operating lever 23 otherwise moves, and the plus and minus positions lie opposite one another as regards the direction of motion. With these unstable positions, a driver of the vehicle can make inputs to the automatic transmission 10. The illustrated position A1 of the operating lever 23 corresponds to the R position, and the illustrated position A2 corresponds to the park position. The drive-setting selector device 22 has sensors (not shown) for detecting the current position of the operating lever 23, which is sent to the control device 19 by the control device 24 by the signal line 21. The control device 24 can monitor the correct operation of the drive-setting selector device 22. If incorrect operation is detected, a fault signal is generated and sent to the control device 19.

The control device 19 is connected to a control device 26 by a signal line 25. The control device 19 sends at least the current position of the drive-setting selector device 22, any fault signal from the drive-setting selector device 22, the position of the actuator 16 and the position of the selector shaft 15 to the control device 26. The control device 26 generates actuating signals for actuators (not shown) of the automatic transmission 10, these being sent to the corresponding actuators by the signal line 27. Sensors (not shown) belonging to the automatic transmission 10 send information on the state of the automatic transmission 10 and at least a rotational speed and direction of rotation of the power-output shaft 12 to the control device 26 via the signal line 27. From the rotational speed of the power-output shaft 12, the control device 26 determines a motor-vehicle speed of travel. This speed of travel and the direction of rotation of the power-output shaft 12 are sent to the control device 19 by the signal line 25.

The control device 19 evaluates the current position of the drive-setting selector device 22 in conjunction with the speed of travel of the motor vehicle and the direction of rotation of the power-output shaft 12. If the speed of travel and the direction of rotation are compatible with the current position of the drive-setting selector device 22, the control device 19 generates control signals on the basis of the current position of the drive-setting selector device 22 and sends these to the actuator 16, which turns the selector shaft 15 to the position corresponding to the current position of the drive-setting selector device 22. For example, the park drive range can be selected and hence the parking interlock engaged only below a certain threshold for the speed of travel. If the speed of travel and direction of rotation are not compatible with the current position of the drive-setting selector device 22, the selector shaft 15 is not turned, with the result that the previous drive range remains selected, and the system waits until a permissible speed of travel and/or direction of rotation is reached.

The actuating device has an ignition lock 28, which is actuated with an ignition key 29 inserted into the ignition lock 28. By turning the ignition key 29, it is possible to move the ignition lock 28 into various positions. As illustrated in FIG. 2, the ignition lock 28 has four positions B1, B2, B3 and B4. In position B1, all the control devices of the motor vehicle are activated; the ignition lock 28 is in this position when the motor vehicle is being driven. The engine of the motor vehicle is started by setting position B2. In position B3, all the control devices of the motor vehicle are deactivated. Setting of position B4 is prevented by an interlock solenoid 30 in normal operation of the actuating device. The interlock solenoid 30 is connected to the control devices 19 and 26 by the signal line 31. In addition, the interlock solenoid 30 prevents the ignition key 29 from being withdrawn from the ignition lock 28 if the parking interlock is not engaged. The interlock solenoid 30 receives the corresponding control signals from the control device 19, which evaluates at least the information from sensor 17 for this purpose. If one of the control devices 19 or 26 detects a fault in the actuating device that jeopardizes safe operation of the motor vehicle or if the control device 19 fails completely, owing to separation from a power supply (not shown) for example, the interlock solenoid 30 is controlled by the control device 19 or 26 in such a way that it assumes a position which allows the ignition lock 28 to be turned to position B4. This also occurs if the interlock solenoid 30 is separated from the power supply. While the ignition lock 28 is in position B3, the ignition key 29 cannot be withdrawn in this position of the interlock solenoid 30 and, furthermore, the ignition lock 29 can no longer be moved to position B1 or B2.

The ignition lock 28 is connected to a release wedge 33 of a parking-interlock accumulator 34 by a Bowden line 32. The parking-interlock accumulator 34 has a predominantly cylindrical housing 35, in which a helical compression spring 36 and a contact plate 37 arranged on the end of the helical compression spring 36 are guided. The release wedge 33 is arranged transversely to the longitudinal direction of the helical compression spring 36. The contact plate 37 is connected to one end 39 of actuating lever 40 by a further Bowden line 38. The other end 41 of the actuating lever 40 is connected in a rotationally fixed manner to the selector shaft 15 of the automatic transmission 10. The actuating lever 40 can thus assume four positions corresponding to the drive ranges or positions of the selector shaft 15. The illustrated position C1 here corresponds to the reverse drive range; position C2 corresponds to the park drive range. Owing to the connection between the actuating lever 40 and the contact plate 37, the contact plate 37 and hence also the helical compression spring 36 can likewise assume four positions. The illustrated position D1 of the contact plate 37 corresponds to position C2 and position D2 corresponds to position C2 of the actuating lever 40. In position D1, the contact plate 37 rests against a lower boundary surface 42 of the release wedge 33, as a result of which the contact plate 37 cannot be moved into position D2 by the stressed helical compression spring 36.

Turning the ignition lock 28 to position B4 causes the Bowden line 32 to pull the release wedge 33 radially out of the housing 35 of the parking-interlock accumulator 34. The contact plate 37 thus no longer rests against the lower boundary surface 42 of the release wedge 33. The helical compression spring 36 can thus relax further and move the contact plate 37 to position D2. By the Bowden line 38, the actuating lever 40 is simultaneously moved to position C2. By virtue of the rotationally fixed connection to the selector shaft 15, the selector shaft 15 is moved into the park position and, as a direct consequence, the parking interlock is therefore engaged. The parking interlock can thus be engaged just once and, after this engagement, the parking-interlock accumulator 34 must be reset.

In position B4 of the ignition lock 28, the ignition key 29 can then also be withdrawn. This ensures that the ignition key 29 can only be withdrawn with the parking interlock engaged, even in the event of a malfunction.

When the actuating device is once more operational and the actuator 16 can move the selector shaft 15 and hence also the actuating lever 40 into a position that differs from position C2, the contact plate 37 is moved out of position D2 in the direction of position D1 when the actuating lever 40 is turned out of position C2 in the direction of position C1. The contact plate 37 then comes into contact with the bevel 43 of the release wedge 33. The bevel 43 gives rise to a force component on the release wedge 33 which pushes the release wedge 33 radially outwards against the force of a helical compression spring 44 and hence opens the way for the contact plate 37 in the direction of position D1. As soon as the contact plate 37 has reached position D1, the release wedge 33 is pushed radially inwards by the helical compression spring 44. The parking-interlock accumulator 34 is thus reset and the parking interlock can be engaged again if there is another malfunction.

In FIG. 2, the ignition lock 28 is shown in a plan view. The ignition lock 28 has four positions B1, B2, B3 and B4, which can be set by an ignition key 29. From position B2, position B4 can only be set via positions B1 and B3. Positions B1 and B2 are arranged in the clockwise direction relative to position B3, while position B4 is arranged in the anticlockwise direction relative to the latter.

Figure 3:
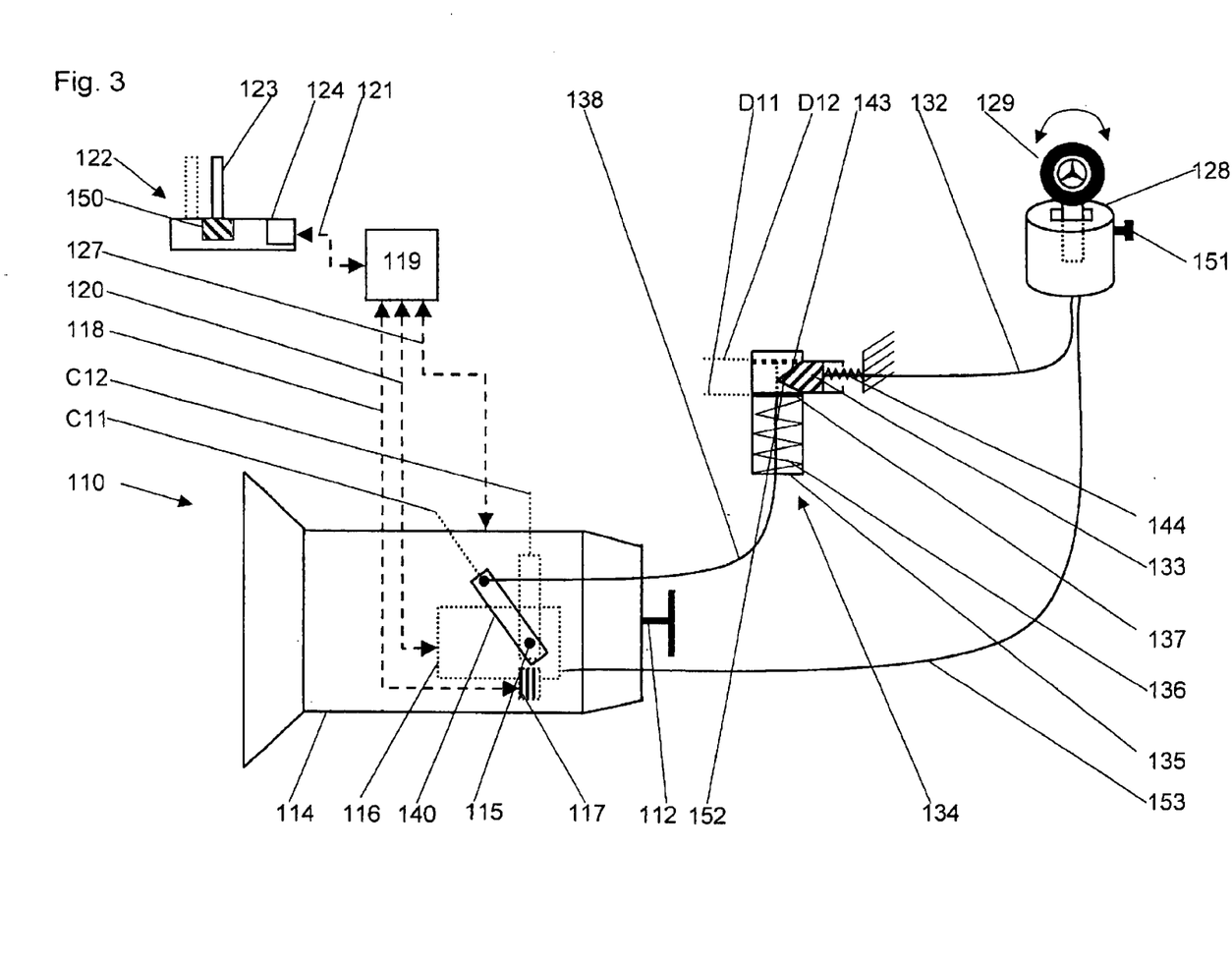
FIG. 3 shows an actuating device in a second exemplary embodiment

FIG. 3 illustrates a second exemplary embodiment of an actuating device. An automatic transmission 110 is likewise embodied as a planetary automatic transmission and has a parking interlock. Various drive ranges, which correspond to the drive ranges of the automatic transmission 10 of the first exemplary embodiment, are selected by turning a selector shaft 115. The selector shaft 115 is turned by an actuator 116, which is arranged inside a housing 114 of the automatic transmission 110. One end of the selector shaft 115 projects from the housing 114. Mounted on the actuator 116 is a sensor 117, which detects the set position of the selector shaft 115 and transmits it to a control device 119 by a signal line 118.

The control device 119 generates control signals for the actuator 116, which are transmitted to the actuator 116 by a signal line 120. The control device 119 furthermore generates actuating signals for actuators (not shown) of the automatic transmission 110, which are sent to the corresponding actuators by the signal line 127. Sensors (not shown) of the automatic transmission 110 send information on the state of the automatic transmission 110 and at least a rotational speed and a direction of rotation of a power-output shaft 112 of the automatic transmission 110 to the control device 119 via the signal line 127. With the rotational speed of the power-output shaft 112, the control device 119 determines a speed of travel of the motor vehicle.

The control device 119 is connected to a control device 124 of a drive-setting selector device 122 by a signal line 121. The control device 119 sends at least the speed of travel of the motor vehicle, the direction of rotation of the power-output shaft 112 and the current position of the selector shaft 115 to the control device 124 by the signal line 121.

The drive-setting selector device 122 has an operating lever 123, which can be moved into the positions P, R, N and D. The positions correspond to the positions of the drive-setting selector device 22 of the first exemplary embodiment. In contrast to the drive-setting selector device 22 of the first exemplary embodiment, the drive-setting selector device 122 has an interlock solenoid 150 which is controlled by the control device 124. With the aid of the interlock solenoid 150, the operating lever 123 can be fixed in various positions. Corresponding control signals are calculated by the control device 124 at least on the basis of the current position of the operating lever 123, the vehicle speed, the direction of rotation of the power-output shaft 112, the current position of the selector shaft 115 and information as to whether a driver of a vehicle is actuating a service brake. The information as to whether the driver of the vehicle is actuating the service brake is made available by a further control device (not shown).

The control device 124 can monitor the correct operation of the drive-setting selector device 122. If correct operation is not detected, a fault signal is generated. The control device 124 sends at least the current position of the drive-setting selector device 122 and any fault signal to the control device 119 by the signal line 121.

On the basis of the current position of the drive-setting selector device 122, the control device 119 generates control signals and sends these to the actuator 116, which turns the selector shaft 115 to the position corresponding to the current position of the drive-setting selector device 122.

The actuating device has an ignition lock 128, which is actuated with an ignition key 129 inserted into the ignition lock 128. By turning the ignition key 129, it is possible to move the ignition lock 128 into various positions B11, B12, B13 and B14. These positions correspond to the positions B1, B2, B3 and B4 of the ignition lock 28 of the first exemplary embodiment. In normal operation of the actuating device, setting of position B14 is prevented by a mechanical interlock device (not shown). In addition, the same interlock device prevents the ignition key 129 from being withdrawn from the ignition lock 128 when the parking interlock is not engaged.

The ignition lock 128 is connected to a release wedge 133 of a parking-interlock accumulator 134 by a flexible shaft 132, which can transmit tensile and compressive forces. The parking-interlock accumulator 134 is fundamentally of identical construction to the parking-interlock accumulator 34 of the first exemplary embodiment. The main difference is that the release wedge 133 has not only a bevel 143 on its upper side but also a further bevel 152 on its opposite, lower side. A contact plate 137 of the parking-interlock accumulator 134 is connected to an actuating lever 140 by a further flexible shaft 138, which can transmit tensile and compressive forces, in a form corresponding to the first exemplary embodiment. As in the first exemplary embodiment, the actuating lever 140 is connected to the selector shaft 115 of the automatic transmission 110. An illustrated position C11 of the actuating lever 140 here corresponds to the reverse drive range, while a position C12 corresponds to the park drive range.

An illustrated position D11 of the contact plate 137 corresponds to position C11 and a position D12 corresponds to position C12 of the actuating lever 140. In position D11, the contact plate 137 rests against the lower bevel 152 of the release wedge 133 and is pressed against the bevel 152 by a stressed helical compression spring 136. The release wedge 133 is pressed radially into a predominantly cylindrical housing 135 of the parking-interlock accumulator 134 by a second helical compression spring 144. The helical compression springs 136 and 144 are designed in such a way that the contact plate 137 remains in position D11 in the absence of further forces on the contact plate 137.

When the selector shaft 115 is turned to the park drive range by the actuator 116 in normal operation of the actuating device and the parking interlock is thus engaged, i.e. the actuating lever 140 is turned to position C12, the flexible shaft 138 exerts a force in the direction of position D12 on the contact plate 137. The bevel 152 gives rise to a force component on the release wedge 133 which pushes the release wedge 133 radially outwards into a disengaged position against the force of the helical compression spring 144 and hence opens the way for the contact plate 137 in the direction of position D12. When the contact plate 137 is in position D12, the release wedge 133 is held in the disengaged position. With the flexible shaft 132, the interlock device in the ignition lock 128 is thus moved to a position which allows the ignition key 129 to be withdrawn. In normal operation of the actuating device, this thus ensures that the ignition key 129 can only be withdrawn when the parking interlock is engaged.

If the actuating device is no longer operational, the driver of the vehicle can actuate an emergency release button 151, which is mounted on the ignition lock 128. Actuating the emergency release button 151 causes the interlock device to enable position B14 of the ignition lock 128. However, the ignition key 129 cannot be withdrawn if the ignition lock 128 is in position B13, even if the emergency release button 151 is actuated.

As in the first exemplary embodiment, turning the ignition lock 128 to position B14 moves the actuating lever 140 to position C12 and hence engages the parking interlock. In addition, the actuator 116 is decoupled from the selector shaft 115 by a Bowden line 153. This means that it is not necessary additionally to overcome sources of resistance in the actuator 116 when turning the selector shaft 115.

Since the contact plate is thus moved into position D12, release for withdrawal of the ignition key 129 takes place, as described with reference to the example of normal operation of the actuating device. This ensures that the ignition key 129 can only be withdrawn when the parking interlock is engaged, even in the event of a malfunction.

When the actuating device is operational once more, the parking-interlock accumulator 134 can be reset as described in the first exemplary embodiment. In addition, the decoupling of the actuator 116 from the selector shaft 115 is cancelled again by a device (not shown) when the parking-interlock accumulator 134 is reset.

Figure 4:
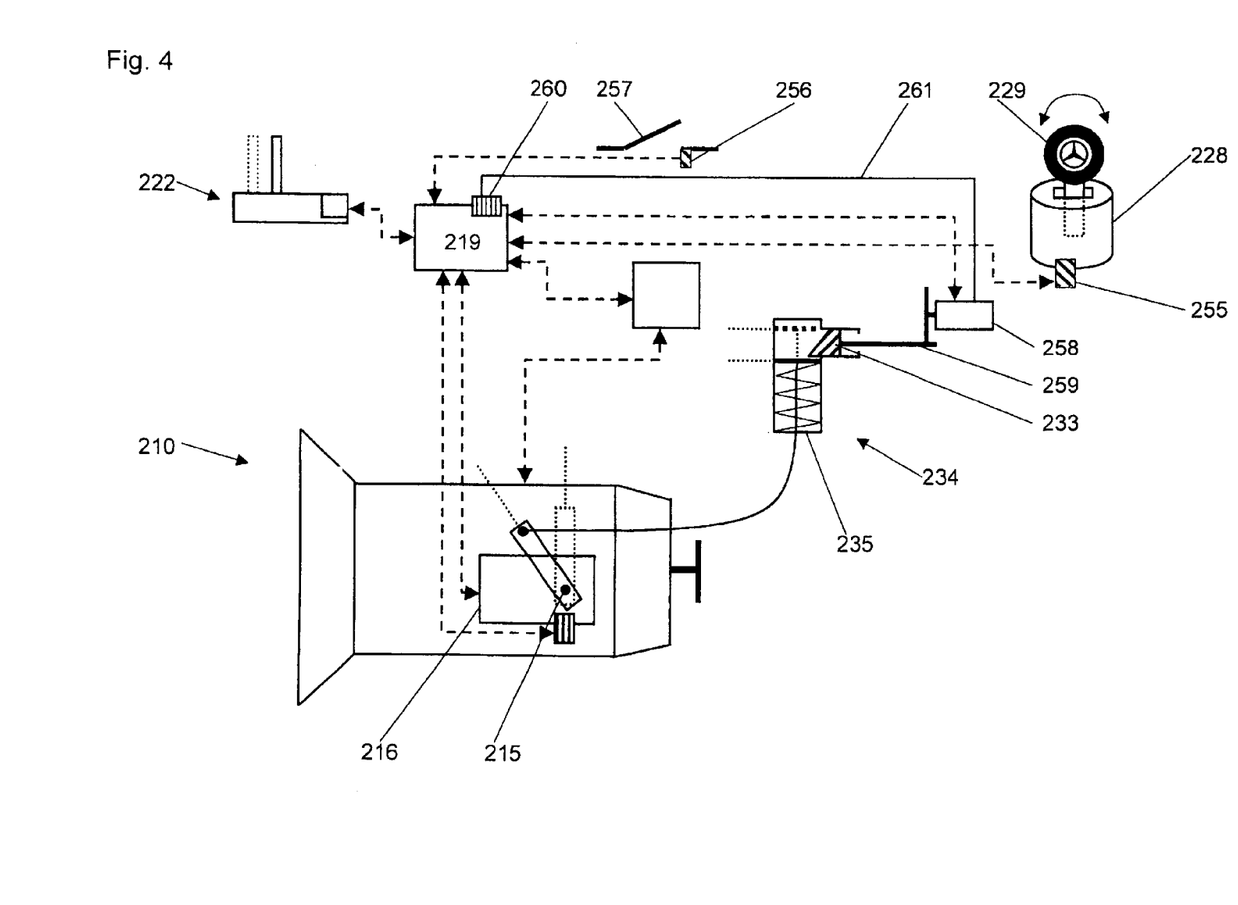
FIG. 4 shows an actuating device with a battery and an actuator in a third exemplary embodiment.

FIG. 4 illustrates a third exemplary embodiment of an actuating device with a battery and an actuator. The actuating device corresponds largely to the actuating device in FIG. 1. For this reason, only the differences with respect to the actuating device in FIG. 1 are described.

A control device 219 for an automatic transmission 210, which communicates via signals with a drive-setting selector device 222 and controls an actuator 216, with which a selector shaft 215 can be turned, additionally communicates via signals with an ignition-lock sensor 255 and a door sensor 256. The ignition-lock sensor 255 detects whether an ignition key 229 is in an ignition lock 228 and passes this information to the control device 219. The door sensor 256 detects whether a vehicle door 257 of the driver of the vehicle is open or closed and passes this information to the control device 219.

The control device 219 communicates via signals with an additional electric motor 258. The electric motor 258 is in effective connection with a spindle 259, which is connected to a release wedge 233 of a parking-interlock accumulator 234. The release wedge 233 can be moved radially relative to a housing 235 of the parking-interlock accumulator 234 by the spindle 259 being turned by the electric motor 258.

The control device 219 additionally has a battery 260. By virtue of the battery 260, the control device 219 is operational even when a connection (not shown) to a vehicle electrical system (not shown), which supplies the control device 219 with electric energy in normal operation, has been interrupted or the vehicle electrical system has broken down. This also applies to the case where the driver of the vehicle has switched off the engine and moved the ignition key 229 to a position in which the control devices of the motor vehicle are no longer operational in normal operation.

The battery 260 is connected to the electric motor 258 by a power line 261. The electric motor 258 can thus be operated independently of the vehicle electrical system.

If the control device 219 detects a fault, the electric motor 258 is controlled in such a way, as soon as the ignition key 229 is removed from the ignition lock 228 or the vehicle door 257 is opened, that the release wedge 233 is pulled radially out of the housing 235 of the parking-interlock accumulator 234. The parking interlock is thereby engaged as with the actuating device in FIG. 1.

When a fault is detected, an indication instrument (not shown) additionally indicates to the driver of the vehicle that the parking interlock is engaged when the ignition key is withdrawn or the vehicle door is opened. This indication is given without the need for the indication instrument to be supplied by the vehicle electrical system.

The automatic transmission can also be embodied as a step-change transmission with an automated clutch and automated gear changes, in which the parking interlock can be engaged and released by a separate actuator. The actuator can be electric, electromagnetic, hydraulic or pneumatic, for example. The actuator can be arranged inside the housing of the automatic transmission or outside the housing. The actuator can be controlled by a separate control device or by a control device which also controls other functions of the automatic transmission.

All the control devices mentioned can also be coupled by a signal bus link (e.g. a serial CAN bus link).

The parking-interlock accumulator can also be released by a device with which an engine bonnet of the motor vehicle can be unlocked. The device is arranged in the interior of the motor vehicle and can be actuated by the driver of the vehicle.

The parking interlock can also be embodied in such a way that an automatic-transmission gearwheel connected to the output shaft of the automatic transmission can be connected to the housing. To secure the vehicle against rolling away, the connection between the engine and the driven wheels can also preferably be established by a reverse gear when the engine is switched off. The motor vehicle is then secured against rolling away by virtue of the friction forces in the engine.

The actuating device can also be embodied in such a way that the ignition key can be removed even when the parking interlock is not engaged in normal operation of the actuating device. In this case, the parking interlock is engaged automatically immediately after the removal of the key.

In addition to the four positions mentioned, the ignition lock can also have a further position, in which control devices of the motor vehicle or electrical appliances, e.g. a radio arranged in the interior, are activated.

The actuating device in accordance with FIG. 4 can also have a withdrawal prevention device which allows the ignition key to be removed from the ignition lock only when the parking interlock is engaged. This withdrawal prevention device can have an interlock solenoid or Bowden lines connecting it to the automatic transmission, for example.

The electric motor can also be connected to the vehicle electrical system in addition to the connection to the battery.

The battery can also be arranged at a distance from the control device.

The embodiments described are only illustrative configurations. Combination of the features described to give different embodiments is likewise possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Actuating device for an automatic transmission of a motor vehicle, the actuating device comprising:
    a drive-setting selector device, which has at least one park position and further positions,
    a control device, which communicates via signals with the drive-setting selector device,
    at least one actuator, which is controllable by the control device,
    drive ranges, which are selectable by the actuator,
    a parking interlock,
    a first device for engaging and releasing the parking interlock,
    a second device for engaging the parking interlock, wherein the second device engages the parking interlock when the first device fails,
    an ignition switch, which includes inactive and active positions, and
    an effective connection between the ignition switch and the second device, wherein the parking interlock is engageable by the effective connection and the second device.

2. Actuating device according to claim 1, wherein the ignition switch includes an emergency actuation position, and the parking interlock is engageable by the setting of the emergency actuation position.

3. Actuating device according to claim 2, wherein the emergency actuation position is arranged in the opposite direction from the active position in relation to the inactive position.

4. Actuating device according to claim 2, wherein the ignition switch includes a locking device, which allows the ignition switch to be moved only into a position different from the emergency actuation position in normal operation of the actuating device.

5. Actuating device according to claim 2, wherein the ignition switch includes an ignition lock, which can be operated by an ignition key, and the ignition lock includes a withdrawal prevention device, which allows the ignition key to be withdrawn only when the parking interlock is engaged.

6. Actuating device according to claim 2, wherein the ignition switch includes an ignition lock, which can be operated by an ignition key, wherein the ignition lock includes a device which allows the ignition lock to be moved only into a position different from the emergency actuation position in normal operation of the actuating device, and the device ensures that an ignition key can be withdrawn only when the parking interlock is engaged.

7. Actuating device according to claim 2, wherein actuation of the ignition switch into the emergency actuation position is prevented by the effective connection between the ignition switch and the second device.

8. Actuating device according to claim 2, wherein the ignition switch has an emergency unlocking device, by which the ignition switch can be moved into the emergency actuation position in the event of a malfunction.

9. Actuating device according to claim 1, wherein the control device communicates via signals with a first sensor, which detects whether there is an ignition key in an ignition lock, and/or with a second sensor, which detects whether a door of the motor vehicle is open or closed, and wherein in the event of a malfunction, the parking interlock is engaged when the ignition key is removed from the ignition lock and/or when a door of the motor vehicle is opened on the basis of a signal from the control device.

10. Actuating device according to claim 9, wherein the second sensor detects whether a door of a driver of a vehicle is open or closed.

11. Actuating device according to claim 9, wherein the second device, by which the parking interlock can be engaged, has an actuator.

12. Actuating device according to claim 9, wherein the actuating device includes an energy storage device.

13. Actuating device according to claim 12, wherein the actuator includes an electric motor.

14. Actuating device according to claim 13, wherein the electric motor is connected to the vehicle's battery via a rower line that is not connected to the rest of electric devices.

15. Actuating device according to claim 1, wherein the second device includes a parking-interlock accumulator, by which the parking interlock is engaged in the event of a malfunction.

16. Actuating device according to claim 1, wherein selection of the drive ranges and actuation of the first device is carried out with just one actuator.

17. Actuating device according to claim 1, wherein the first device can be operated with a separate actuator.

18. Actuating device according to claim 17, wherein the parking interlock can be engaged independently of the actuator by which the first device is actuated.

19. Actuating device according to claim 18, wherein the second device is in effective connection with a third device, by which an engine bonnet of the motor vehicle can be unlocked.

20. Method for actuating an automatic transmission of a motor vehicle, which transmission includes a drive-setting selector device, which has at least one park position and further positions, a control device, which communicates via signals with the drive-setting selector device, at least one actuator, which is controllable by the control device, drive ranges, which is selectable by the actuator, a parking interlock, and a first device for engaging and releasing the parking interlock, the method comprising:

providing a second device for engaging the parking interlock, wherein the second device engages the parking interlock when the first device fails, and providing an effective connection between an ignition switch, which includes inactive and active positions, and the second device, wherein the parking interlock is engageable by the effective connection and the second device.

21. Method according to claim 20, further comprising providing the ignition switch with an emergency actuation position, and the parking interlock is engageable by the setting of the emergency actuation position.

22. Method according to claim 21, further comprising arranging the emergency actuation position in the opposite direction from the active position in relation to the inactive position.

23. Method according to claim 21, further comprising providing the ignition switch with a locking device, which allows the ignition switch to be moved only into a position different from the emergency actuation position in normal operation of the actuating device.

24. Method according to claim 21, further comprising providing the ignition switch with an ignition lock, which can be operated by an ignition key, and providing the ignition lock with a withdrawal prevention device, which allows the ignition key to be withdrawn only when the parking interlock is engaged.

25. Method according to claim 21, further comprising providing the ignition switch with an ignition lock, which can be operated by an ignition key, and providing the ignition lock with a device which allows the ignition lock to be moved only into a position different from the emergency actuation position in normal operation of the actuating device, wherein the device ensures that an ignition key can be withdrawn only when the parking interlock is engaged.

26. Method according to claim 21, wherein actuation of the ignition switch into the emergency actuation position is prevented by the effective connection between the ignition switch and the second device.

27. Method according to claim 21, further comprising providing the ignition switch with an emergency unlocking device, by which the ignition switch can be moved into the emergency actuation position in the event of a malfunction.

28. Method according to claim 20, wherein the control device communicates via signals with a first sensor, which detects whether there is an ignition key in an ignition lock, and/or with a second sensor, which detects whether a door of the motor vehicle is open or closed, and wherein in the event of a malfunction, the parking interlock is engaged when the ignition key is removed from the ignition lock and/or when a door of the motor vehicle is opened on the basis of a signal from the control device.

29. Method according to claim 28, wherein the second sensor detects whether a door of a driver of a vehicle is open or closed.

30. Method according to claim 28, wherein the second device, by which the parking interlock can be engaged, has an actuator.

31. Method according to claim 28, further comprising providing the actuating device with an energy storage device.

32. Actuating device for an automatic transmission of a motor vehicle, the actuating device comprising:

a drive-setting selector device, which has at least one park position and further positions, a control device, which communicates via signals with the drive-setting selector device, at least one actuator, which is controllable by the control device, drive ranges, which are selectable by the actuator, a parking interlock, a first device for engaging and releasing the parking interlock, a second device for engaging the parking interlock, wherein the second device engages the parking interlock when the first device fails, and an energy storage device.

\* \* \* \* \*